(12) United States Patent
Yun et al.

(10) Patent No.: US 8,587,873 B2
(45) Date of Patent: Nov. 19, 2013

(54) WIDE-ANGLE PROJECTION LENS FOR PROJECTION DISPLAY SYSTEMS

(75) Inventors: Zhisheng Yun, Woodbury, MN (US); Stephen J. Willett, St. Paul, MN (US); Ernesto M. Rodriguez, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/810,744

(22) PCT Filed: Jul. 29, 2011

(86) PCT No.: PCT/US2011/045836
§ 371 (c)(1), (2), (4) Date: Jan. 17, 2013

(87) PCT Pub. No.: WO2012/027064
PCT Pub. Date: Mar. 1, 2012

(65) Prior Publication Data
US 2013/0235464 A1 Sep. 12, 2013

Related U.S. Application Data

(60) Provisional application No. 61/377,526, filed on Aug. 27, 2010.

(51) Int. Cl.
*G02B 13/04* (2006.01)
(52) U.S. Cl.
USPC .............................. 359/649; 359/749; 359/751
(58) Field of Classification Search
USPC .................. 359/649–651, 680–682, 749–753
See application file for complete search history.

(56) References Cited

U.S. PATENT DOCUMENTS

| | | | |
|---|---|---|---|
| 5,442,484 A * | 8/1995 | Shikawa | ........................ 359/651 |
| 5,625,495 A | 4/1997 | Moskovich | |
| 5,870,228 A | 2/1999 | Kreitzer | |
| 6,124,978 A | 9/2000 | Yoneyama | |
| 6,179,426 B1 | 1/2001 | Rodriguez, Jr. | |

(Continued)

FOREIGN PATENT DOCUMENTS

| | | |
|---|---|---|
| JP | 2004-279958 | 10/2004 |
| JP | 2004-318108 | 11/2004 |

(Continued)

OTHER PUBLICATIONS

Fischer et al, Optical System Design, McGraw Hill, New York (2008) pp. 191-198.

(Continued)

*Primary Examiner* — Scott J Sugarman
(74) *Attorney, Agent, or Firm* — Carolyn A. Fischer

(57) ABSTRACT

Wide-angle projection lens, as well as optical engines and projection display devices comprising such projections lens are described. In one embodiment, a wide-angle projection lens is described comprising in sequential order from a screen side a first lens group of negative refractive power, a second lens group of positive refractive power, a third lens group of positive refractive power; and a fourth lens group of positive refractive power. At least one lens group has an aspheric surface. The ratio of the focal length of the wide-angle projection lens (F) to the focal length of each of the lens groups ($F_1$, $F_2$, $F_3$, and $F_4$) is such that $|F_1/F|>1.3$, $F_2/F>2$, $1<F_3/F<2$ and $1.5<F_4/F<8$.

18 Claims, 2 Drawing Sheets

(56) References Cited

U.S. PATENT DOCUMENTS

| | | |
|---|---|---|
| 6,195,209 B1 | 2/2001 | Kreitzer |
| 6,324,014 B1 | 11/2001 | Moskovich |
| 6,476,974 B1 | 11/2002 | Kreitzer |
| 6,563,650 B2 | 5/2003 | Moskovich |
| 6,590,716 B2 | 7/2003 | Narimatsu |
| 6,765,731 B1 | 7/2004 | Cannon |
| 6,888,682 B2 | 5/2005 | Kawakami |
| 7,002,753 B2 | 2/2006 | Moskovich |
| 7,123,426 B2 | 10/2006 | Lu |
| 7,126,767 B2 | 10/2006 | Lu |
| 7,145,729 B2 | 12/2006 | Kreitzer |
| 7,173,777 B1 | 2/2007 | Lu |
| 7,230,770 B2 | 6/2007 | Kreitzer |
| 7,271,964 B2 | 9/2007 | Rodriguez, Jr. |
| 7,489,449 B2 | 2/2009 | Kawana |
| 7,580,194 B2 | 8/2009 | Lin |
| 7,633,688 B2 | 12/2009 | Kamo |
| 7,656,587 B2 | 2/2010 | Hsu |
| 7,667,898 B2 | 2/2010 | Minefuji |
| 2002/0097500 A1 | 7/2002 | Ikeda |
| 2009/0168028 A1 | 7/2009 | Magarill |

FOREIGN PATENT DOCUMENTS

| | | |
|---|---|---|
| JP | 2008-116697 | 5/2008 |
| JP | 2008-176261 | 7/2008 |
| KR | 10-2002-0083514 | 11/2002 |
| KR | 10-2004-0078914 | 9/2004 |
| WO | WO 2012/027096 | 3/2012 |

OTHER PUBLICATIONS

Moskovich "Lenses for High-Resolution Microdisplays"—SID '99 Symposium, (1999).

International Search Report PCT/US2011/045836 Mar. 28, 2012, 4 pgs.

* cited by examiner

WIDE-ANGLE PROJECTION LENS FOR PROJECTION DISPLAY SYSTEMS

SUMMARY

Although various projection lenses have been described, industry would find advantage in (e.g. compact) projection lens having improved properties such as a high throughput, a large field of view, and combinations thereof.

In one embodiment, a wide-angle projection lens is described comprising in sequential order from a screen side a first lens group of negative refractive power, a second lens group of positive refractive power, a third lens group of positive refractive power; and a fourth lens group of positive refractive power. At least one lens group has an aspheric surface. The ratio of the focal length of the wide-angle projection lens (F) to the focal length of each of the lens groups ($F_1$, $F_2$, $F_3$, and $F_4$) is such that $|F_1/F|>1.3$, $F_2/F>2$, $1<F_3/F<2$ and $1.5<F_4/F<8$.

In another embodiment, a wide-angle projection lens is described having a field angle ranging from 50 to 85 degrees, an F# of 1.2 to 1.8, and a ratio of maximum diameter to focal length of no greater than 3.5.

In another embodiment, a wide-angle projection lens having a field angle ranging from 50 to 85 degrees, an F# of 1.2 to 1.8, and a ratio of total track to focal length of no greater than 9.0.

In yet other embodiments, optical engines are described comprising an illumination system, an imaging system; and a wide-angle projection lens as described therein. Front-projection and rear-projection display devices are described comprising such optical engine.

These figures are not drawn to scale and are intended only for illustrative purposes.

DETAILED DESCRIPTION

Presently described are wide-angle projection lens suitable for use in projection display systems.

Figure 1:
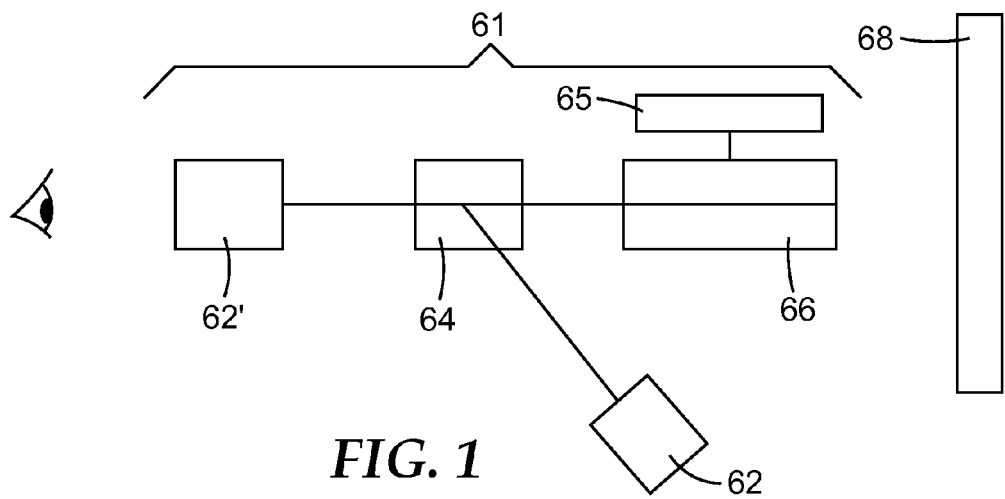
FIG. 1 is a schematic representation of an exemplary optical engine that can be used in the present invention.
Figure 3A:
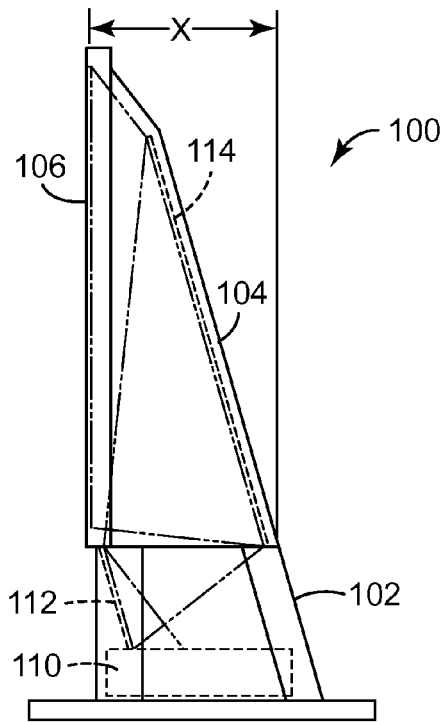
FIGS. 3A and 3B show a side view and an isometric view, respectively, of an embodied rear projection display device.
Figure 3B:
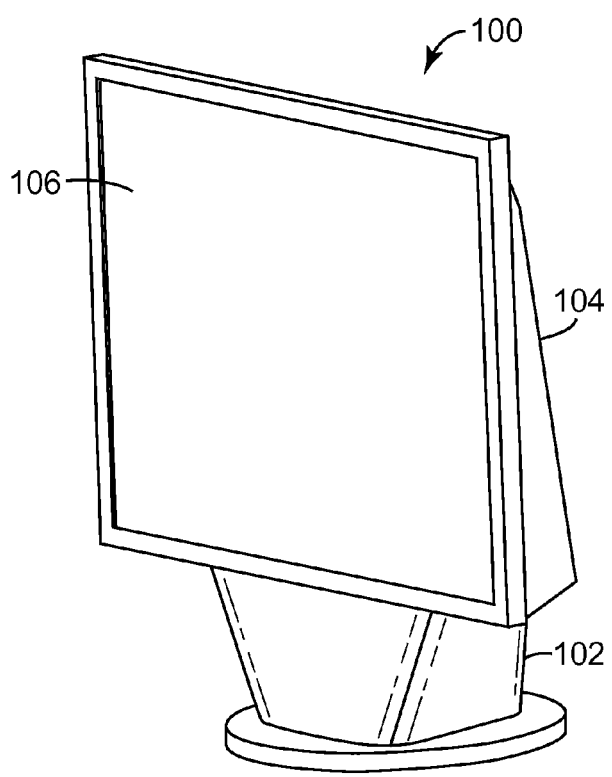

FIG. 1 shows a schematic representation of exemplary optical engine 61 having one or more of the following components: illumination system 62 or 62', imaging system 64, a focus mechanism 65, and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62' the imager used is a transmissive imager. The optical engine can generate an image on a projection screen 68 or a viewing surface. Because the viewer and the optical engine are on the same side of the projection screen, FIG. 1 depicts a front projection display system using optical engine 61. FIGS. 3A and 3B depict a rear projection display system using optical engine 110. Each element in the optical engine is discussed in detail below.

The illumination system 62, 62' can include a lamp unit, a filter (such as an infrared light and/or a ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in embodiments of the present invention are not critical. In one exemplary embodiment, the color separation means is a spinning red/green/blue (RGB) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in embodiments of the present invention. An illustrative commercially available integrator is a hollow tunnel type integrator from UNAXIS Balzers LTD.

The imaging system 64 includes an imager and typically also includes electronics. A useful reflective imager that can be used in the present invention is a XGA digital micromirror device (DMD) having a diagonal of about 22 mm, available from Texas Instruments, Dallas, Tex. Alternatively, a transmissive or reflective liquid crystal display can be used as the imager. In the optical engine, the surface of the imager is positioned substantially parallel to the surface of the projection screen.

For some implementations, a focusing mechanism 65 can be accomplished by mounting one or more of the lenses described below on a slidable or threaded mount (not shown), which can be adjusted manually by hand or through the use of an electronic actuation mechanism. For example, focusing can be accomplished by using a varifocal or a zoom lens. Alternatively, no user focus is required for projection units having a predetermined fixed position established between the optical engine 61 and the viewing screen 68 or for rear projection applications.

In some implementations, the screen 68 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multi-layer film technology, Dual Brightness Enhancement Film (DBEF) technology, or VIKUITI™ technology, all available from 3M Company, Saint Paul, Minn. Optionally, the generated image can be viewed on any surface, e.g., a wall or other structure, or standard viewing screen.

In favored embodiments, the wide-angle projection lens described herein is compact. The "compactness" of a projection lens may be characterized by various physical features. In one embodiment, a compact projection lens is described having a ratio of maximum lens diameter to focal length (i.e. $L_{max}/F$). The maximum lens diameter is the diameter of the lens element having the greatest diameter. The lens closest to a screen side is often the lens element having the maximum lens diameter. As this ratio decreases, the diameter of the totality of lens groups decreases as well. The compact projection lens described herein typically has a ratio of maximum lens diameter to focal length of no greater than 3.5, or no greater than 3.4 or no greater than 3.3. In some embodiments, the ratio of maximum lens diameter to focal length is no greater than 3.0, or no greater than 2.5, or no greater than 2.0. The minimum ratio of maximum lens diameter to focal length is typically at least 1.5.

Alternatively, or in combination thereof, the "compactness" of the projection lens described herein may be characterized by the "total track" or ratio of total track to focal length (i.e. TT/F). The total track (TT) of a projection lens is defined as the total distance from the 1$^{st}$ surface of the first lens group (in closest proximity to the screen side) to the last surface of the last lens group (in closest proximity to the imager). The term "screen side" means that side of the projection lens closest to a projection screen. The compact projection lens described herein typically has a total track of no greater than 100 mm or 90 mm. In some embodiments, the total track is no greater than 65 mm or 70 mm. In other embodiments, the total track is no greater than 75 mm or about 80 mm. The minimum total track is typically at least 50 mm. The compact projection lens described herein typically has a ratio of total track to focal length of no greater than 8.5. In some embodiments, the ratio of total track to focal length is no greater than 7.0, or no greater than 6.0. The minimum ratio of total track to focal length is typically at least 5.5.

In favored embodiments, the wide-angle projection lens described herein has a high throughput, as characterized by the F#. The F# is typically at least 1.2, or 1.3, or 1.4. The F# is typically no greater than 1.8, or 1.7. In some embodiments, the F# is not greater than 1.6.

In favored embodiments, the wide-angle projection lens described herein has a relatively large field of view characterized by a field angle of at least 45 or 50 degrees and preferably 50 or 55 degrees. The field angle may range up to about 80 or 85 degrees. In some embodiments, the field angle may range up to 75 degrees, or 70 degrees, or 65 degrees. The power of the first lens group (G1), wherein the power is equal to 1/focal length, can be modified to adjust the field of view. As depicted in the forthcoming examples, when |F$_1$/F| is slightly above 1.3, the field angle is about 80 degrees; whereas when |F$_1$/F| is about 2.0, the field angle of about 55 degrees. Hence, as the power of the first lens group (G1) becomes increasingly negative, the field of view increases.

The projection lens described herein has a high resolution. Resolution refers to the smallest feature size of an image the projection lens can resolve. Resolution can be determined by use of Modulation Transfer Function (MTF) which represents the transfer of modulation from the object to the image by the lens as a function of spatial frequency. MTF can be calculated as described in *Optical System Design*; Robert E. Fischer, Biljana Tadic-Galeb, Paul R. Roder; McGraw Hill, New York (2008), pp. 191-198. Resolution is defined as the minimum width of alternating (black) lines and (white) spaces for which the MTF at full field is greater than or equal to 0.30. In some embodiments, the resolution is 15 microns or 10 microns. In other embodiments, the resolution is 9 microns, 8 microns, or 7 microns, or 6 microns.

In favored embodiments, a compact wide-angle projection lens is described having a combination of high throughput and a large field of view. One exemplary embodiment of a projection lens having such combination of features is depicted in FIG. 2.

Figure 2:
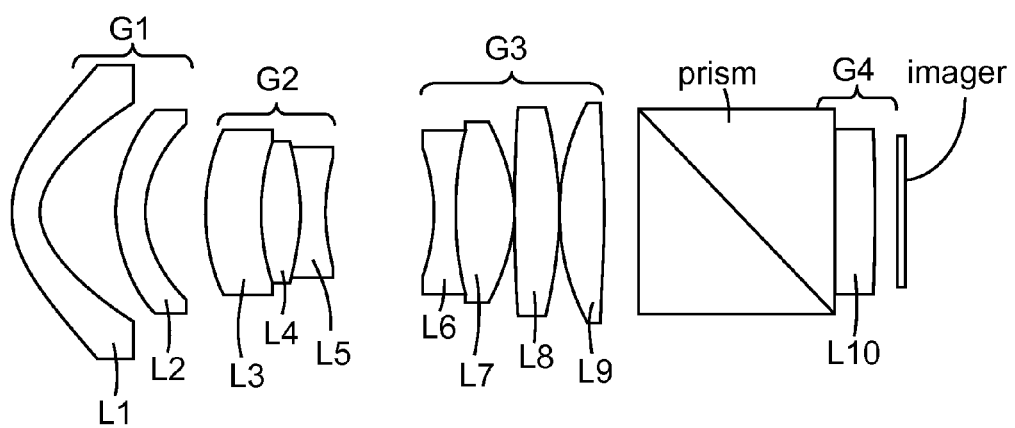
FIG. 2 is a schematic representation of an exemplary projection optics that can be used in the present invention.

The projection optics of FIG. 2 include four lens groups (as identified from an output side or screen side): first lens group (G1), second lens group (G2), a third lens group (G3), and a fourth lens group (G4). The term "screen side" means that side of the projection lens closest to a projection screen. As would be apparent to one of ordinary skill in the art given the present description herein, alternative constructions of projection lens 66 can be employed, including alternative constructions that include fewer, the same, or greater numbers of lens elements.

The exemplary projection lens of FIG. 2 includes a total of ten (10) elements in the four lens groups, numbered from the screen side. The first lens group (G1) is formed of, in order from the screen side, a first lens element (L1) and a second lens element (L2). The ratio of F$_1$/F in G1 is such that |F$_1$/F|>1.3. In some embodiments, |F$_1$/F| is at least 1.5 or 1.6 or 1.7 or 1.8 or 1.9 or 2.0. The second lens group (G2) is formed of three lens elements, (L3) to (L5) inclusive, typically cemented together using a conventional adhesive. G2 is of positive refractive power. The aperture stop lies within the second lens group or between the second and third lens group. The ratio of F$_2$/F in G2 is such that F$_2$/F>2. In some embodiments, F$_2$/F is at least 2.5 or 2.6 or 2.7 or 2.8 or 2.9 or 3.0. The third lens group (G3) is formed of four lens elements (L6) to (L9) inclusive. G3 is of positive refractive power. The ratio of F$_3$/F is such that 1<F$_3$/F<2. In some embodiments, F$_3$/F is at least 1.1. In other embodiments, F$_3$/F is at least 1.2 or 1.3 or 1.4 or 1.5 or 1.6 or 1.7.

As shown in FIG. 2, a transparent solid (e.g. glass) prism lies between the third lens group (G3) and fourth lens group (G4). In some embodiments, the prism provides no appreciable amount of refractive power. In other embodiments, the prism comprises a lens surface that contributes to the refractive power of the fourth lens group.

The fourth lens group (G4) is of positive refractive power. The ratio of F$_4$/F is such that 1.5<F$_4$/F<8. In some embodiments, F$_4$/F is at least 2 or 3. In other embodiments, F$_4$/F is at least 4 or 5.

At least one lens element of at least one lens group has an aspheric surface. The shape of the aspheric surface can be defined by the equation below:

$$Z = \frac{cr^2}{1+\sqrt{1-(1+k)c^2r^2}} + \alpha_2 r^2 + \alpha_4 r^4 + \alpha_6 r^6 + \alpha_8 r^8 + \alpha_{10} r^{10} + \alpha_{12} r^{12} + \alpha_{14} r^{14} \quad \text{Equation I}$$

wherein

Z is the surface sag at a distance r from the optical axis of the system, c is the curvature of the lens at the optical axis in $$\frac{1}{mm},$$

r is the radial coordinate in mm, k is the conic constant, and $\alpha_2$ is the coefficient for second order term, $\alpha_4$ is the coefficient for fourth order term, $\alpha_6$ is the coefficient for sixth order term, $\alpha_8$ is the coefficient for eighth order term, $\alpha_{10}$ is the coefficient for tenth order term, $\alpha_{12}$ is the coefficient for twelfth order term, and $\alpha_{14}$ is the coefficient for fourteenth order term.

In some embodiments, the first lens group comprises an aspheric surface. Alternatively, the third lens group may comprise an aspheric surface. The fourth lens group typically, but optionally, comprises an aspheric surface as well. For ease in fabrication, each lens having an aspheric surface is typically formed from a thermoplastic or cured polymeric material of optical quality. The second lens group typically lacks a lens element having an aspheric surface. Each of the lenses lacking an aspheric surface may optionally be formed from a thermoplastic or cured polymeric material, but are typically formed from glass. Optical quality lens materials typically have a refractive index of at least about 1.50.

The four lens groups are discussed in detail as follows.

The first lens group (G1) is of negative refractive power. The first lens group is formed of a plurality of lens elements. In the first lens group, a first lens element (L1), lying closest to the screen, typically has the largest diameter of all the lenses in the (e.g. four) lens groups. The first lens element in the first lens group has a sufficiently large diameter to project an image at a large field, i.e., at a field angle greater of at least 50° and more preferably at least about 55° in the direction of the screen with substantially no distortion. The first lens element of the first lens group typically has a diameter no greater than 50 mm, or 40 mm. The first lens element of the first lens group preferably has a diameter no greater than 35 mm or 30 mm. The minimum diameter of the first lens of the first lens group is typically at least 20 mm.

In one embodiment the first lens element (L1) is comprised of plastic and has an aspheric surface.

The first lens group (G1) typically includes a second lens element (L2). In one embodiment, the second lens element of the first lens group is a spherical glass lens.

The second lens group (G2) is of positive refractive power. The second lens group may be formed of a plurality (e.g. three) of lens elements. The aperture stop of the projection lens lies within or near the second lens group. All the lens of the second lens group may be comprised of glass and have spherical surfaces. In one exemplary embodiment, the second lens group comprises a cemented triplet to help control spherical aberration and coma. The cemented triplet may include a positive refractive power lens (L4) cemented between two negative refractive power lens, (L3 and L5).

The third lens group (G3) is of positive refractive power. The third lens group may be formed of a plurality (e.g. four) lens elements. All the lens of the second lens group may be comprised of glass and have spherical surfaces. The second lens group typically includes at least one or two singlets (L4 and L5) and a doublet (L6 and L7).

An optional (e.g. glass) prism is disposed between the third lens group and the imager, i.e., at a location furthest away from the screen side.

The fourth lens group (G4) proximate the projection imager is of positive refractive power. In one embodiment, the fourth lens element (L1) is comprised of plastic and has an aspheric surface.

The spacing between the lenses can be adjusted to balance the aberration(s).

Tables 1-3 below list the general lens data, surface data summary, and aspheric coefficients for a first embodiment of FIG. 2. Table 2 below lists the surface number, in order from the screen side (with surface 1 being the surface closest to the screen side of the first lens element L1), the radius (r) near the optical axis of each surface (millimeters), the on axis spacing (D) between the surfaces (in millimeters), and the material type is also indicated. The curvature can be calculate by the equation curvature (c)=1/radius. One skilled in the art recognizes that from the material type, it is possible to determine the index of refraction and Abbe number of the material. Surface 0 is the object surface or the surface of the projection screen.

TABLE 1

GENERAL LENS DATA

| | |
|---|---|
| Surfaces | 22 |
| Effective Focal Length | 13.7998 (in air at system temperature and pressure) |
| Effective Focal Length | 13.7998 (in image space) |
| Back Focal Length | 13.7998 (in image space) |
| Total Track | 80.36069 |
| Image Space F/# | 1.604078 |
| Paraxial Working F/# | 1.604522 |
| Working F/# | 1.604522 |
| Image Space NA | 0.2975089 |
| Object Space NA | 0.002679321 |
| Stop Radius | 5.1 |
| Paraxial Image Height | 7.11 |
| Paraxial Magnification | −0.00859809 |
| Entrance Pupil Diameter | 8.602952 |
| Entrance Pupil Position | 23.52905 |
| Exit Pupil Diameter | 267.1612 |
| Exit Pupil Position | −428.6 |
| Field Type | Real Image height in Millimeters |
| Maximum Radial Field | 7.11 |
| Primary Wavelength | 0.525 μm |
| Lens Units | Millimeters |
| Angular Magnification | 0.03220077 |

TABLE 2

SURFACE DATA SUMMARY

| Surf | Type | Radius | On Axis Spacing (D) | Lens Material | Diameter | Conic | Comment |
|---|---|---|---|---|---|---|---|
| OBJ | STANDARD | Infinity | 1581.9 | | 1664.843 | 0 | |
| 1 | EVENASPH | 8.759585 | 2.654092 | E48R | 28 | −0.9540754 | G1, L1 |
| 2 | EVENASPH | 5.728749 | 6.776198 | | 20.78471 | −1.174114 | |
| 3 | STANDARD | 15.52823 | 2.665589 | N-LAK21 | 19.65793 | 0 | G1, L2 |
| 4 | STANDARD | 11.40413 | 5.400266 | | 16.88586 | 0 | |
| 5 | STANDARD | 20.59942 | 5.011797 | P-5F67 | 15.83557 | 0 | G2, L3 |
| 6 | STANDARD | 24.288 | 3.488573 | S-LAM52 | 13.36859 | 0 | G2, L4 |
| 7 | STANDARD | −22.41484 | 2.290683 | L-PHL2 | 12.4254 | 0 | G2, L5 |
| 8 | STANDARD | 21.21493 | 5.162702 | | 10.43896 | 0 | |
| STO | STANDARD | Infinity | 4.58174 | | 10.2 | 0 | Aperture Stop |
| 10 | STANDARD | −18.11202 | 1.853676 | S-TIH53 | 12.44728 | 0 | G3, L6 |
| 11 | STANDARD | 30.93641 | 5.26255 | S-LAM3 | 15.3958 | 0 | G3, L7 |
| 12 | STANDARD | −16.72721 | 0.05295922 | | 17.16442 | 0 | |
| 13 | STANDARD | 145.7545 | 4 | S-LAH55 | 19.25953 | 0 | G3, L8 |

TABLE 2-continued

SURFACE DATA SUMMARY

| Surf | Type | Radius | On Axis Spacing (D) | Lens Material | Diameter | Conic | Comment |
|---|---|---|---|---|---|---|---|
| 14 | STANDARD | −41.14966 | 0.02247284 | | 20.06704 | 0 | |
| 15 | STANDARD | 22.16669 | 4.133519 | N-FK51A | 20.8 | 0 | G3, L9 |
| 16 | STANDARD | −117.6083 | 3.093871 | | 20.67595 | 0 | |
| 17 | STANDARD | Infinity | 17.5 | N-BK7 | 19.53084 | 0 | G4, L10 PBS |
| 18 | STANDARD | Infinity | 0.08 | | 15.85409 | 0 | |
| 19 | STANDARD | Infinity | 3.63 | VH001 | 15.82828 | 0 | G4, L11 |
| 20 | EVENASPH | −39.56962 | 2 | | 15.09703 | 0 | |
| 21 | STANDARD | Infinity | 0.7 | S-BSL7 | 14.39825 | 0 | |
| IMA | STANDARD | Infinity | | | 14.25393 | 0 | |

For this first embodiment, both the first and second surfaces of the first lens element of the first lens group (denoted as surfaces 1 and 2 in Table 2) are aspheric and the first surface of the fourth lens group (denoted as surface 20 in Table 2) is aspheric, as governed by Equation I above, and have the following values for the coefficients:

TABLE 3

ASPHERICAL COEFFICIENTS

| Coefficient | Surface 1 | Surface 2 | Surface 20 |
|---|---|---|---|
| $\alpha_2$ | 0 | 0 | 0 |
| $\alpha_4$ | −0.00013386013 | 0 | 0.00027523436 |
| $\alpha_6$ | $2.3599201 \times 10^{-7}$ | 0 | $-6.1926126 \times 10^{-6}$ |
| $\alpha_8$ | $-8.0963531 \times 10^{-10}$ | 0 | $3.0932596 \times 10^{-7}$ |
| $\alpha_{10}$ | $7.8958509 \times 10^{-12}$ | 0 | $-9.3925953 \times 10^{-9}$ |
| $\alpha_{12}$ | $-4.1255848 \times 10^{-14}$ | 0 | $1.3114542 \times 10^{-10}$ |
| $\alpha_{14}$ | $7.840875 \times 10^{-17}$ | 0 | $-6.8564554 \times 10^{-13}$ |

In this first embodiment, the wide-angle projection lens has an effective overall focal length of 13.8 mm, a field angle of 54.8° in the direction of the screen side and operates at F/1.60. The projection lens has a total track of 80.3 mm. Hence, $L_{max}/F=2.029$ and $TT/F=5.909$.

The first lens group G1 has an effective focal length of −27.6 mm; the second lens group G2 has an effective focal length of 41.9 mm; the third lens group G3 has an effective focal length of 16.2 mm; and the fourth group has an effective focal length of 80.1 mm. Hence, each lens group focal length relative to entire lens effective focal length has the following relationship:

$F_1/F=-2.000, F_2/F=3.036, F_3/F=1.171,$ and
$F_4/F=5.803.$

MTF data were generated on this embodiment using a spatial frequency of 71 line pair(lp)/mm (7.0 microns pixel size). The tangential and sagittal MTFs are in the following table. Since all the MTF values are greater than or equal to 0.30, the resolution is 7.0 microns.

| | Field (normalized) | | | |
|---|---|---|---|---|
| | 0 Center of Field | 0.5 (50% Field of View) | 0.707 (71% Field of View) | 1 (100% Field of View) |
| Tangential MTF | 0.43 | 0.62 | 0.66 | 0.60 |
| Sagittal MTF | 0.43 | 0.46 | 0.30 | 0.54 |

Tables 4-6 below list the general lens data, surface data summary, and aspheric coefficients for a second embodiment of FIG. 2.

TABLE 4

GENERAL LENS DATA

| Surfaces | 22 |
|---|---|
| Effective Focal Length | 8.533734 (in air at system temperature and pressure) |
| Effective Focal Length | 8.533734 (in image space) |
| Back Focal Length | 0.07298651 |
| Total Track | 71.73987 |
| Image Space F/# | 1.541341 |
| Paraxial Working F/# | 1.541277 |
| Working F/# | 1.598737 |
| Image Space NA | 0.3085753 |
| Object Space NA | 0.001735127 |
| Stop Radius | 5.1 |
| Paraxial Image Height | 7.11 |
| Paraxial Magnification | −0.00534863 |
| Entrance Pupil Diameter | 5.536563 |
| Entrance Pupil Position | 13.53241 |
| Exit Pupil Diameter | 708.2755 |
| Exit Pupil Position | 1091.766 |
| Field Type | Real Image height in Millimeters |
| Maximum Radial Field | 7.11 |
| Primary Wavelength | 0.525 μm |
| Lens Units | Millimeters |
| Angular Magnification | −0.007817699 |

TABLE 5

SURFACE DATA SUMMARY

| Surf | Type | Radius | On Axis Spacing (D) | Lens Material | Diameter | Conic | Comment |
|---|---|---|---|---|---|---|---|
| OBJ | STANDARD | Infinity | 1581.9 | | 2689.577 | 0 | |
| 1 | EVENASPH | 24.39568 | 2.654092 | E48R | 28 | 1.111658 | G1, L1 |
| 2 | EVENASPH | 7.792699 | 6 | | 17.8 | −0.3972219 | |
| 3 | STANDARD | 42.97717 | 2.665589 | N-LAK21 | 17.4 | 0 | G1, L2 |
| 4 | STANDARD | 13.56337 | 3.195455 | | 15.28477 | 0 | |
| 5 | STANDARD | 25.75888 | 3 | P-SF67 | 15.60859 | 0 | G2, L3 |
| 6 | STANDARD | −90.84121 | 3.488573 | S-LAM52 | 15.27506 | 0 | G2, L4 |
| 7 | STANDARD | −44.65395 | 2.290683 | L-PHL2 | 14.37989 | 0 | G2, L5 |
| 8 | STANDARD | 187.893 | 6.298913 | | 13.34526 | 0 | |
| STO | STANDARD | Infinity | 1.222442 | | 10.2 | 0 | Aperture Stop |
| 10 | STANDARD | −26.79933 | 1.853676 | S-TIH53 | 10.87992 | 0 | G3, L6 |
| 11 | STANDARD | 18.17384 | 5.26255 | S-LAM3 | 13.59475 | 0 | G3, L7 |
| 12 | STANDARD | −16.63497 | 0.05295922 | | 15.41496 | 0 | |
| 13 | STANDARD | 171.8864 | 4 | S-LAH55 | 17.14845 | 0 | G3, L8 |
| 14 | STANDARD | −51.51854 | 0.1 | | 18.22092 | 0 | |
| 15 | STANDARD | 23.83816 | 4.133519 | N-FK51A | 19.6 | 0 | G3, L9 |
| 16 | STANDARD | −56.96615 | 1.61142 | | 19.20806 | 0 | |
| 17 | STANDARD | Infinity | 17.5 | N-BK7 | 18.56183 | 0 | G4, L10 PBS |
| 18 | STANDARD | Infinity | 0.08 | | 15.52028 | 0 | |
| 19 | STANDARD | Infinity | 3.63 | VH001 | 15.49897 | 0 | G4, L11 |
| 20 | EVENASPH | −16.86296 | 2 | | 14.94198 | 0 | |
| 21 | STANDARD | Infinity | 0.7 | S-BSL7 | 14.40247 | 0 | |
| IMA | STANDARD | Infinity | | | 14.30285 | 0 | |

For this second embodiment, both the first and second surfaces of the first lens element of the first lens group (denoted as surfaces 1 and 2 in Table 5) are aspheric and the first surface of the fourth lens group (denoted as surface 20 in Table 5) is aspheric, as governed by Equation I above, and have the following values for the coefficients:

TABLE 6

ASPHERICAL COEFFICENTS

| Coefficient | Surface 1 | Surface 2 | Surface 20 |
|---|---|---|---|
| $\alpha_2$ | 0 | 0 | 0 |
| $\alpha_4$ | −7.5343876e−006 | 0 | 0.00075946205 |
| $\alpha_6$ | 6.3058096e−008 | 0 | −1.4937719e−005 |
| $\alpha_8$ | −1.482186e−009 | 0 | 3.8628325e−007 |
| $\alpha_{10}$ | 9.7548956e−012 | 0 | −8.5121653e−009 |
| $\alpha_{12}$ | −3.1755985e−014 | 0 | 1.1157475e−010 |
| $\alpha_{14}$ | 3.1913846e−017 | 0 | −6.0077909e−013 |

In this second embodiment, the wide-angle projection lens has an effective overall focal length of 8.5 mm, a field angle of 80.1° in the direction of the screen side and operates at F=1.54. The projection lens has a total track of 71.1 mm. Hence, $L_{max}/F=3.281$ and TT/F=8.406. Hence, each lens group focal length relative to entire lens effective focal length has the following relationship: $F_1/F=-1.363$, $F_2/F=3.032$, $F_3/F=1.796$, and $F_4/F=3.999$.

MTF data were generated on this embodiment using a spatial frequency of 40 line pair(lp)/mm (12.5 microns pixel size). The tangential and sagittal MTFs are in the following table. Since all the MTF values are greater than or equal to 0.30, the resolution is 12.5 microns.

| | Field (normalized) | | | |
|---|---|---|---|---|
| | 0 Center of Field | 0.5 50% Field of View | 0.707 70% Field of View | 1 100% Field of View |
| Tangential MTF | 0.37 | 0.66 | 0.62 | 0.51 |
| Sagittal MTF | 0.37 | 0.40 | 0.30 | 0.48 |

The optical engine described above can be utilized in a variety of projection applications. In an exemplary rear projection application, FIGS. 3A and 3B show a side view and an isometric view, respectively, of a rear projection display device 100. In an exemplary embodiment, display device 100 includes an optical engine 110, similar to optical engine 61 described above, and including a wide angle projection lens, similar to projection optics 66 described above.

Rear projection display device 100 includes a base 102, a cabinet 104, and a screen 106. As shown in FIGS. 3A and 3B, the rear projection display device can be implemented as a rear projection television. Other implementations can include commercial and educational display devices that can present a large (e.g., 40 inch diagonal or greater) image to one or more viewers.

The base 102 can house components such as optical engine 110, as well as a power supply, control electronics, audio components, and a connector panel (not shown for simplicity), one or more of which can be coupled to the optical engine 110. The base 102 can also be configured to provide structural support for display device 100. In addition, depending on the design of the optical engine 110, the base can further include a reflecting surface, such as mirror 112, which can direct the image projected from the optical engine 110 to screen 106 and/or an additional reflecting surface or surfaces, such as reflecting surface or mirror 114, which is housed in cabinet 104. The reflective surfaces (or mirrors) 112, 114 used in the rear projection display device 100 can be configured as, e.g., first surface mirrors, a reflective fresnel surface (or surfaces), or another high reflective material. As would be apparent to one of ordinary skill in the art given the present description, one or more reflecting surfaces can be utilized with the optical engine described herein to provide a projected image to screen 106.

Cabinet 104 can be configured to house one or more reflecting surfaces, such as mentioned above. Further, cabinet 104 can support viewing screen 106, which can be configured to provide one or more different image formats, such as a 4×3 format, or a 16×9 format.

Screen 106, which receives the projected image (see e.g., the example phantom lines shown in FIG. 3A), can vary in size and shape, based on the projected image size and format. Regarding screen construction, for example, the screen 106 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multi-layer film technology, Dual Brightness Enhancement Film (DBEF) technology, or VIKUITI™ technology, all available from 3M Company, Saint Paul, Minn.

As mentioned above, optical engine 110 can be constructed in a manner similar to optical engine 61 described above with respect to FIG. 1, and can include a wide angle projection lens, similar to projection optics 66 described above. In addition, optical engine 110 can include an illumination system and an imaging system similar to that described above, and can be structurally configured to accommodate different base and cabinet designs.

For example, optical engine 110 can have a V-shape type layout, a U-shape type layout, or an L-shape type layout, depending on the type of imager or illumination system utilized. As wide angle/short throw type optical engine 110 can provide an image at a large field, i.e., at a field angle of at least 50 degrees, preferably at least 55 degree ranging up to about 80 degree., the depth (x) of cabinet 104 can be reduced from that of conventional rear projection display devices. For example, the depth (x) of cabinet 104 can be from about 5 inches to about 15 inches, preferably from about 7 inches to about 12 inches, and more preferably from about 7 inches to about 10 inches. As would be understood given the present description, the depth (x) of cabinet 104 can vary based on factors such as screen diagonal size and image format.

In an exemplary embodiment, optical engine 110 can include an imager or imaging device utilizing, e.g., DLP, LCD, or LCOS technology. In one exemplary embodiment, the optical engine can provide an image having a 4×3 format. In another exemplary embodiment, the optical engine can be implemented with a suitable imager to provide a different screen format, such as a 16×9 format. In further exemplary embodiments, the illumination system can be constructed from, for example, a lamp unit (such as an arc lamp or other types of lamps), in a manner similar to that described above. Alternatively, the illumination system of optical engine 110 can utilize a solid-state system, such as a laser-based or LED-based system.

Alternatively, the optical engine can be implemented with correction circuitry (e.g., a conventional warp chip), which can result in sufficient image quality at even shorter throw distances.

In addition, the optical engine is designed so that little or no keystone correction is necessary, while distortion is reduced. For example, distortion values for the projected image can be less than or equal to 2%, preferably less than or equal to 1.0%, and more preferably less than or equal to 1.5%, and even more preferably less than or equal to 0.5% (e.g., where distortion (d) can be determined by: d=(H−h)/h*100, where h is the paraxial image height and H is actual image height).

In an alternative embodiment, a rear projection display device can be designed for a wall-mounted or ceiling-hung implementation, where the base section is implemented to house the optical engine and other electronics, and is not required to support the device as a stand.

Those skilled in the art will appreciate that the present invention may be used with a variety of different optical components. While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. A wide-angle projection lens comprising the following components in sequential order from a screen side:
    (a) a first lens group of negative refractive power;
    (b) a second lens group of positive refractive power;
    (c) a third lens group of positive refractive power;
    (d) a fourth lens group of positive refractive power; and
at least one lens group has an aspheric surface;
wherein
    F is the focal length of the wide-angle projection lens;
    $F_1$ is the focal length of the first lens group;
    $F_2$ is the focal length of the second lens group;
    $F_3$ is the focal length of the third lens group;
    $F_4$ is the focal length of the fourth lens group; and
ratios of the focal lengths are as follows:

$$|F_1/F|>1.3;$$

$$F_2/F>2;$$

$$1<F_3/F<2; \text{ and}$$

$$1.5<F_4/F<8.$$

2. The wide-angle projection lens of claim 1, wherein an aperture stop lies within the second lens group or between the second and third lens group.

3. The wide-angle projection lens of claim 1, wherein the field angle is at least 50° in the direction of the screen side.

4. The wide-angle projection lens of claim 1, wherein the projection lens has an F# of no greater than 2.0.

5. The wide-angle projection lens of claim 1, wherein the projection lens has an F# of no greater than 1.8.

6. The wide-angle projection lens of claim 4, wherein the projection lens has an F# of at least 1.2.

7. The wide-angle projection lens of claim 1 wherein the projection lens has a ratio of total track to focal length of no greater than 9.0.

8. The wide-angle projection lens of claim 1 wherein the projection lens has a ratio of maximum diameter to focal length of no greater than 3.5.

9. The wide-angle projection lens of claim 1 wherein the first or third lens group has an aspheric surface.

10. The wide-angle projection lens of claim 1 wherein the fourth lens group has an aspheric surface.

11. The wide-angle projection lens of claim 1 wherein the lens further comprises a prism between the third and fourth lens groups.

12. The wide-angle projection lens of claim 11 wherein the prism comprises a lens surface that contributes to the refractive power of the fourth lens group.

13. The wide-angle projection lens of claim 1 wherein the lens has a resolution of 7 microns.

14. The wide-angle projection lens of claim 1 wherein the lens is suitable for use in a rear projection display system.

15. The wide-angle projection lens of claim 1 wherein the lens is suitable for use in a front projection display system.

16. An optical engine comprising:
  (a) an illumination system;
  (b) an imaging system; and
  (c) the wide-angle projection lens of claim 1.

17. A front-projection display device comprising the optical engine of claim 16.

18. A rear-projection display device comprising the optical engine of claim 16.

* * * * *